(No Model.)

W. F. WARE.
VALVED RUBBER AIR BULB.

No. 451,179. Patented Apr. 28, 1891.

WITNESSES:

INVENTOR:
Walter F. Ware,
By his Attorney
Horace Pettit

UNITED STATES PATENT OFFICE.

WALTER F. WARE, OF CAMDEN, NEW JERSEY.

VALVED RUBBER AIR-BULB.

SPECIFICATION forming part of Letters Patent No. 451,179, dated April 28, 1891.

Application filed April 5, 1890. Serial No. 346,736. (No model.)

*To all whom it may concern:*

Be it known that I, WALTER F. WARE, of the city of Camden and State of New Jersey, have invented a certain new and useful Improvement in Valved Rubber Air-Bulbs; and I do hereby declare the following to be a full, clear, and exact description thereof, reference being had to the accompanying drawings, forming a part of this specification.

My invention has relation to valved air-bulbs for exhausting the air from vacuum-bulbs to produce a vacuum or a partial vacuum, and also for forcing air and liquids, as in atomizers, syringes, and for such like purposes; and it consists in a flexible rubber bulb having, in combination with an air-valve operating in one direction secured in one part thereof, a slotted or lipped flexible valve operating in the opposite direction, and preferably integral with the air-bulb itself.

My invention is adapted for many purposes, but is specially applicable to breast-pumps, and I will describe its operation in connection with a breast-pump. The lipped valve which I describe in combination with the air-bulb having another valve operating in the opposite direction may, according to its adjustment to the bulb, serve as either the egress or the ingress valve, but always operating the reverse to the other air-valve. I however herein, for the purposes of illustration, describe the lipped valve as the egress-valve principally.

In the accompanying drawings similar letters of reference refer to similar parts throughout.

Figure 1:
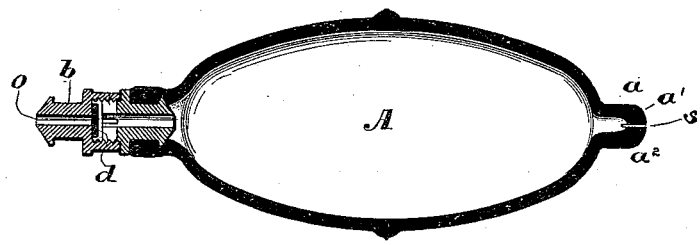
Figure 2:
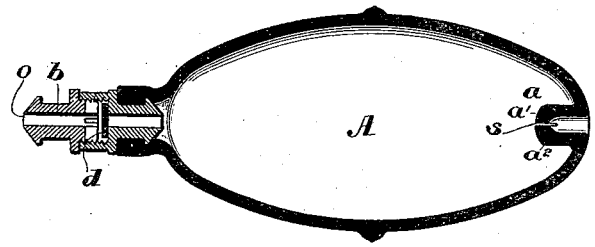
Figure 3:
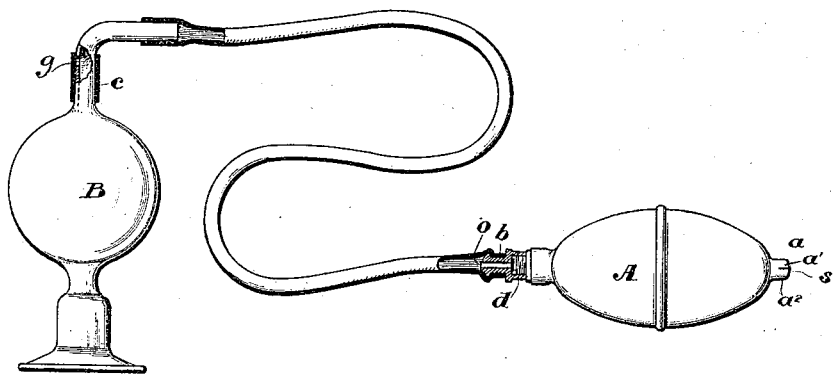

Figure 1 is a longitudinal sectional view of my improved air-bulb. Fig. 2 shows the valves adjusted and operating in the reverse direction from that shown in Fig. 1. Fig. 3 shows the device in connection with a breast-pump.

A is the flexible rubber air-bulb, provided in the upper part with an ingress air-valve $b$ of ordinary construction, having a washer $d$, adapted to be forced against the orifice $o$ when the bulb A is compressed, and thus prevents the egress of the air therethrough, but is adapted by its construction to allow of a free passage of air therethrough when the bulb A is expanded by its elasticity. The valve $a$ is a longitudinally-disposed projection of rubber, preferably constructed as an integral part of the rubber bulb A, and is provided with a slit orifice $s$, forming the two lips $a'$ $a^2$, which, as the bulb is expanded or is in the act of expanding, tend to bite closely together and prevent the ingress of any air therethrough. In this manner a most effectual egress-valve is constructed. It will be seen, as the lips $a'$ $a^2$ are rigidly affixed to the walls of the bulb or are an integral part thereof, that in the construction shown in Figs. 1 and 3 the projection extends outward and the compression of the bulb tends to force open and apart the lips and allow of the egress of the air and in the act of expansion to equally effectually close tightly the lips together and prevent any ingress whatsoever, the reverse of which occurs in the construction shown in Fig. 2, in which the projection extends inward.

I am aware that valves of somewhat similar construction have been heretofore known and used at the end of tubes or within tubes wherein the opening and closing of the valved lips is due entirely to the force of the air in one direction to their expansion, and their contraction to the suction in the other direction; but in the combination herein described and claimed of the said valve with the air-bulb an important feature toward the effectual opening and closing of the said valve is the fixity of each lip practically to the walls of the bulb, which in the act of compression and expansion open and close the lips more effectually and produce a more perfect and efficient valve.

Another feature of my invention is that the liability of the valve to break or to get out of order is reduced to a minimum, and, further, that the cost of production is materially reduced. As hereinbefore stated, the said lipped valve $a$ is preferably constructed integrally with the bulb A, but may be separately constructed and secured thereto.

In operation—as, for instance, when connected with a breast-pump appliance in the construction shown in Figs. 1 and 3—when the bulb A is compressed the lips $a'$ $a^2$ expand and allow of the free egress of the air, while at the same time the orifice $o$ of the valve $b$ is closed by the small washer $d$. As the bulb A expands, the lips $a'$ $a^2$ are tightly closed by the act of expansion of the bulb A, and the valve *b* opening a vacuum is produced in the vacuum-bulb B, and the milk from the breast thus allowed to flow. This vacuum may be readily destroyed by pressing back the flexible covering *c* and exposing the orifice *g* connected with the vacuum-bulb B.

In the construction shown in Fig. 2, where the valves are reversed, the effect of the compression and expansion of the bulb A is inversely to that above described.

This description merely illustrates the operation of my improved valved air-bulb, which may be applied to numerous purposes.

Having thus described my invention, what I claim, and desire to secure by Letters Patent, is—

1. A flexible air-bulb having provided integrally with its walls a longitudinally-disposed flexible valvular projection at one end of said bulb, said valvular projection provided in its end with a slit the lips of which open or close as the integral walls of the bulb are compressed or relaxed, the flexible air-bulb, and an additional air-valve provided at the other end of said bulb, constructed to operate inversely to said flexible valve, as set forth.

2. In combination with a flexible hose, a flexible air-bulb to which the said hose is attached at one end, said bulb provided at the other end with a flexible valve consisting of a longitudinally-disposed flexible projection having a slit in its end, and an additional air-valve between the end of the hose applicable to the object to be exhausted and the bulb, said flexible valve operating in a direction contrary to the air-valve, as set forth.

3. In combination with a breast-pump, a vacuum-bulb B, having a vent or orifice *g*, flexible covering *c*, and tube connection, a flexible air-bulb having provided integrally with its walls a longitudinally-disposed flexible valvular projection at one end of said bulb, said valvular projection provided in its end with a slit the lips of which open or close as the integral walls of the bulb are compressed or relaxed, the flexible air-bulb, and an additional air-valve provided at the other end of said bulb, constructed to operate inversely to said flexible valve, as set forth.

In witness whereof I have hereunto set my hand this 4th day of April, A. D. 1890.

WALTER F. WARE.

Witnesses:
JAMES M. CASSADY,
T. F. BOARDMAN.